United States Patent
Yoshioka

(10) Patent No.: US 6,964,264 B2
(45) Date of Patent: Nov. 15, 2005

(54) FUEL SUPPLY APPARATUS

(75) Inventor: Hiroshi Yoshioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/475,355

(22) PCT Filed: Mar. 18, 2002

(86) PCT No.: PCT/JP02/02537

§ 371 (c)(1),
(2), (4) Date: Oct. 20, 2003

(87) PCT Pub. No.: WO03/078823

PCT Pub. Date: Sep. 25, 2003

(65) Prior Publication Data

US 2005/0011557 A1 Jan. 20, 2005

(51) Int. Cl.⁷ .............................................. F02M 37/04
(52) U.S. Cl. ...................... 123/509; 123/514; 137/576
(58) Field of Search ................................. 123/509, 514, 123/510, 456; 137/574, 572, 576, 596

(56) References Cited

U.S. PATENT DOCUMENTS 5,080,077 A * 1/1992 Sawert et al. ................ 123/514
5,195,494 A * 3/1993 Tuckey ........................ 123/514
5,647,330 A * 7/1997 Sawert et al. ................ 123/509
5,758,627 A * 6/1998 Minagawa et al. .......... 123/509
5,762,047 A   6/1998 Yoshioka et al.
6,152,174 A * 11/2000 Hein ............................ 137/576
6,360,765 B1 * 3/2002 Pozgainer ................. 137/15.01
6,655,364 B1 * 12/2003 Yoshioka .................... 123/509

FOREIGN PATENT DOCUMENTS

| JP | 11294282 | 10/1999 |
| JP | 2001-3826 | 1/2001 |
| JP | 2002-39030 | 2/2002 |
| JP | 2-83368 | 6/2002 |
| WO | WO 96-14506 | 5/1996 |

* cited by examiner

*Primary Examiner*—Carl S. Miller
(74) *Attorney, Agent, or Firm*—Sughrue Mion, PLLC

(57) ABSTRACT

In a fuel supply apparatus (33), a lid (40) includes a first guide tube (48) provided extending toward inside of a fuel tank (31); a reservoir (34) is provided extending from a bottom thereof toward the side of the lid (40) and houses the fuel pump (35) as well as includes a second guide tube (41) that inscribed in the first guide tube (48) and fitted thereto in a slidable manner; and an elastic member (49) is provided that is inserted and fitted to an outer circumference of the foregoing second guide tube (41) as well as interposed between the reservoir (34) and the lid (40) to enable the reservoir (34) to travel telescopically with respect to the lid (40).

6 Claims, 5 Drawing Sheets

FUEL SUPPLY APPARATUS

TECHNICAL FIELD

The present invention relates to a fuel supply apparatus that is mounted on a fuel tank and supplies fuel to an internal combustion engine and, more particularly, to a fuel supply apparatus provided with a reservoir that retains the fuel in the fuel tank.

BACKGROUND ART

FIG. 4 is a longitudinal cross sectional view showing a conventional fuel supply apparatus disclosed, for example, in the Japanese Patent Publication (unexamined) No. 294282/1999. FIG. 5 is a cross sectional view taken along the line V—V of FIG. 4.

Generally a vehicle such as automobile is mounted with a fuel tank 1 for supplying fuel to an internal combustion engine such as engines. A fuel supply apparatus 3 is mounted at an opening 2 of the fuel tank 1.

A filter-equipped pump 4 includes a fuel pump part 5 that pumps fuel and feeds the fuel to the internal combustion engine such as engine and a fuel filter part 6 that removes foreign substances mixed into the fuel, and the fuel pump part and the fuel filter part are integrally formed into a cylindrical shaped filter-equipped pump 4. This cylindrical filter-equipped pump 4 possesses an integral construction in which a tubular fuel filter part 6 is fitted concentrically around an outer circumference of the cylindrical fuel pump part 5, and is formed into an integral structure.

A disk-shaped intake filter 7, which communicates with an intake port of the fuel pump part 5, is mounted on a bottom of the filter-equipped pump 4. A discharge port of the fuel pump part 5 and an inlet of the fuel filter part 6 are connected together with the use of a flexible tube 8. Further, another flexible tube 10, which is provided with a joint 9 at a tip portion, is connected to an outlet of the fuel filter part 6.

In the fuel tank 1, there is provided a bottomed reservoir 12 having a cylindrical shape that is in contact with a bottom 11 of the fuel tank 1 and houses the filter-equipped pump 4. This reservoir 12 is arranged so as to cause a predetermined volume of fuel to be retained at all times so that the fuel pump part 5 may pump the fuel without fail, even in the case where the fuel tank 1 becomes inclined and the fuel in the fuel tank 1 is retained at one side. There is provided a fuel inlet 13, which communicates with an internal part of the fuel tank 1, at the bottom portion of the reservoir 12.

Meanwhile, the fuel tank 1 is provided with a lid 14 to be mounted in an opening 2, which is formed at a top surface thereof. Through this lid 14, there is provided a fuel discharge passage part 15 to which the joint 9 at the tip portion of the flexible tube 10 connected to the outlet of the fuel filter part 6. A reservoir mounting wall 16 of a cylindrical shape or a partially cylindrical shape is molded on a back side (inside part of the fuel tank 1) of the lid 14, extending toward an axial direction 17 of the above-mentioned reservoir 12 so as to surround the fuel discharge passage part 15.

Furthermore, the reservoir-mounting wall 16 is formed so that inner diameter thereof may be substantially the same as or slightly larger than outer diameter of the filter-equipped pump 4, as well as outer diameter thereof may be substantially the same as or slightly smaller than inner diameter of the above-mentioned reservoir 12, thus capable of being inserted between the filter-equipped pump 4 and the reservoir 12.

A guide void 18, which extends in the axial direction 17, is formed at plural positions of a circumferential direction in an internal part of the reservoir 12; as well as a guide rod 19 (also refer to FIG. 5) is formed, which is fitted in a slidable manner into the guide void 18 in plural positions of the reservoir-mounting wall 16 corresponding to the guide voids 18. An elastic member 20 such as coil spring is interposed between the guide void 18 and the guide rod 19 to constitute a return mechanism 21. The reservoir 12 can move resiliently with respect to the lid 14 due to an elastic force provided by the elastic member 20 such as coil spring.

An engaging detent 22 is formed in plural positions of a circumferential direction on the outside of the reservoir mounting wall 16; as well as a plurality of catching slots 23, which extend in the axial direction 17, and in which the engaging detents 22 are caught and held movably, are formed at the reservoir 12 in the positions corresponding to the engaging detents 22. In addition, numeral 24 designates a liquid measure, and numeral 25 designates a flexible tube of a fuel return passage part.

In the fuel supply apparatus 3 constructed as described above, at the time of inserting the reservoir 12 into the opening 2 of the fuel tank 1 and thereafter mounting the lid 14 in the opening 2, an entire length of the fuel supply apparatus 3 is adjusted in the following manner. That is, since the reservoir 12 and the lid 14 are fitted in a telescopic manner due to an impetus provided by the elastic member 20 such as coil spring, the bottom of the reservoir 12 comes in contact with a bottom surface 11 of the fuel tank 1 whereby the reservoir 12 travels with respect to the lid 14 telescopically, and an entire length of the fuel supply apparatus 3 is adjusted so as to match depth of the fuel tank 1.

Now, flow of the fuel in the fuel supply apparatus 3 is described. As shown in FIG. 4, when driving the fuel pump part 5 of the filter-equipped pump 4, the fuel in the reservoir 12 is pumped through the disk-shaped inlet filter 7, which is attached to the intake side of the fuel pump part 5, and relatively large foreign substances, which have been mixed into the fuel, are removed through the intake filter 7.

Then, the fuel having been discharged from the discharge port of the fuel pump part 5 is sent to the inlet of the fuel filter part 6 disposed around the outer circumference of the fuel pump part 5 through the flexible tube 8, gets in the fuel filter part 6 from the inlet thereof, and flows in the fuel filter part 6 so as to run around the outer circumference of the fuel pump part 5, whereby foreign substances having been contained in the fuel are filtered and removed. The fuel having got out of the outlet of the fuel filter part 6 flows in the fuel discharge passage part 15 provided through the lid 14, by way of the flexible tube 10. Subsequently, the fuel is fed to the internal combustion engine such as engine through a fuel hose, not shown, from the fuel discharge passage part 15.

In the conventional fuel supply apparatus 3, as described above, the guide void 18, which extends in an axial direction, is formed in plural positions of a circumferential direction in an internal part of the reservoir 12; and the rod-shaped guide rod 19, which fits in the guide void 18 in a slidable manner at the positions corresponding to the guide voids 18 on the reservoir mounting wall 16. Further, the elastic member 20 such as coil spring is interposed between the guide void 18 and the guide rod 19, resulting in constitution of the return mechanism. The reservoir 12 and the lid 14 are made telescopic due to an elastic force provided by the elastic member 20. Accordingly, the coil spring is located in a narrow space sandwiched between an inner wall of the reservoir 12 and an outer circumference of the filter-equipped pump 4 to constitute an elastic function, and therefore a large average diameter of the coil spring cannot be achieved. Further, since a load change per deflection length of the coil spring becomes large, adaptability for dimensional change of the fuel tank gets worse, and load applied to the tank becomes larger. Moreover, since a plurality of coil springs are disposed at a circumferential portion apart from a central portion of the reservoir 12, a problem exists in that unbalance occurs in pressure load, whereby the reservoir 12 is not pressed stably to the fuel tank 1.

Moreover, since the fuel filter part 6 is located in a position proximate to the bottom of an internal part of the reservoir 12, a retention volume of fuel comes to be smaller by the amount corresponding to the volume of the fuel filter part 6. Therefore, in the state in which a fuel liquid level is, low, inclination of the fuel tank makes it difficult to pump the fuel. As a measure of this trouble, another problem exists in that a reservoir grows in size.

The present invention was made to solve such problems as described above and has an object of providing a fuel supply apparatus capable of stably adapting to change in tank dimension without applying any excessively large load onto the fuel tank.

The present invention has another object of providing a more compact fuel supply apparatus.

DISCLOSURE OF INVENTION

A fuel supply apparatus according to the present invention includes: a lid which is mounted at an opening of a fuel tank, and through which a fuel discharge passage part is provided; a fuel pump that sends under pressure fuel in the mentioned fuel tank through the mentioned fuel discharge passage part; a fuel filter that filters the fuel having been discharged from the mentioned fuel pump; and a reservoir that is in contact with a bottom surface of the mentioned fuel tank, and retains the fuel in the mentioned fuel tank; and in which the mentioned lid includes a first guide tube provided extending toward the inside of the mentioned fuel tank; the mentioned reservoir is provided extending from a bottom thereof toward the side of the mentioned lid and houses the mentioned fuel pump as well as includes a second guide tube that is inscribed with the mentioned first guide tube and fitted thereto in a slidable manner; and the fuel supply apparatus further including an elastic member that is inserted and fitted to an outer circumference of the mentioned second guide tube as well as interposed between the mentioned reservoir and the mentioned lid thereby enabling the mentioned reservoir to travel telescopically with respect to the mentioned lid.

As a result, it is possible to obtain a fuel supply apparatus capable of stably adapting to dimensional change in the tank without applying any excessively large load onto the fuel tank.

In the mentioned fuel supply apparatus according to this invention, the mentioned elastic member is preferably inserted and fitted to an outer circumference of the mentioned second guide tube as well as interposed between the mentioned second guide tube and the mentioned first guide tube, thereby enabling the mentioned reservoir to travel telescopically with respect to the mentioned lid.

In the mentioned fuel supply, the mentioned elastic member is preferably one coil spring inserted and fitted to an outer circumference of the mentioned second guide tube.

Furthermore, in the mentioned fuel supply apparatus, the mentioned fuel pump is preferably located from the mentioned reservoir to the mentioned lid; and the mentioned fuel filter is disposed on the mentioned lid outside an outer circumferential surface of the mentioned fuel pump, surrounding the mentioned fuel pump.

As a result, a more compact fuel supply apparatus can be obtained.

BEST MODE FOR CARRYING OUT THE INVENTION

Figure 1:
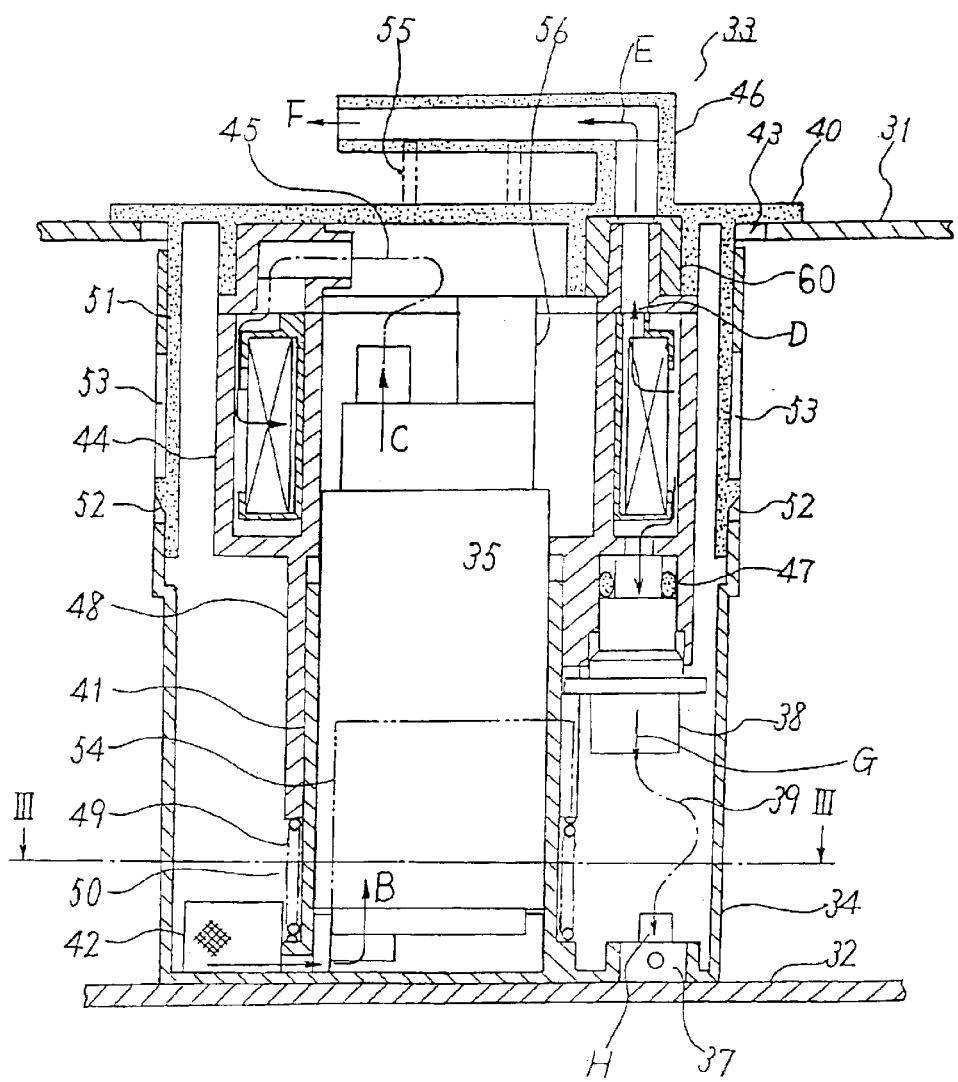
FIG. 1 is a longitudinal cross sectional view showing a fuel supply apparatus according to a preferred embodiment of the present invention.

A fuel supply apparatus according to a preferred embodiment of the present invention is hereinafter described referring to the drawings.

Figure 2:
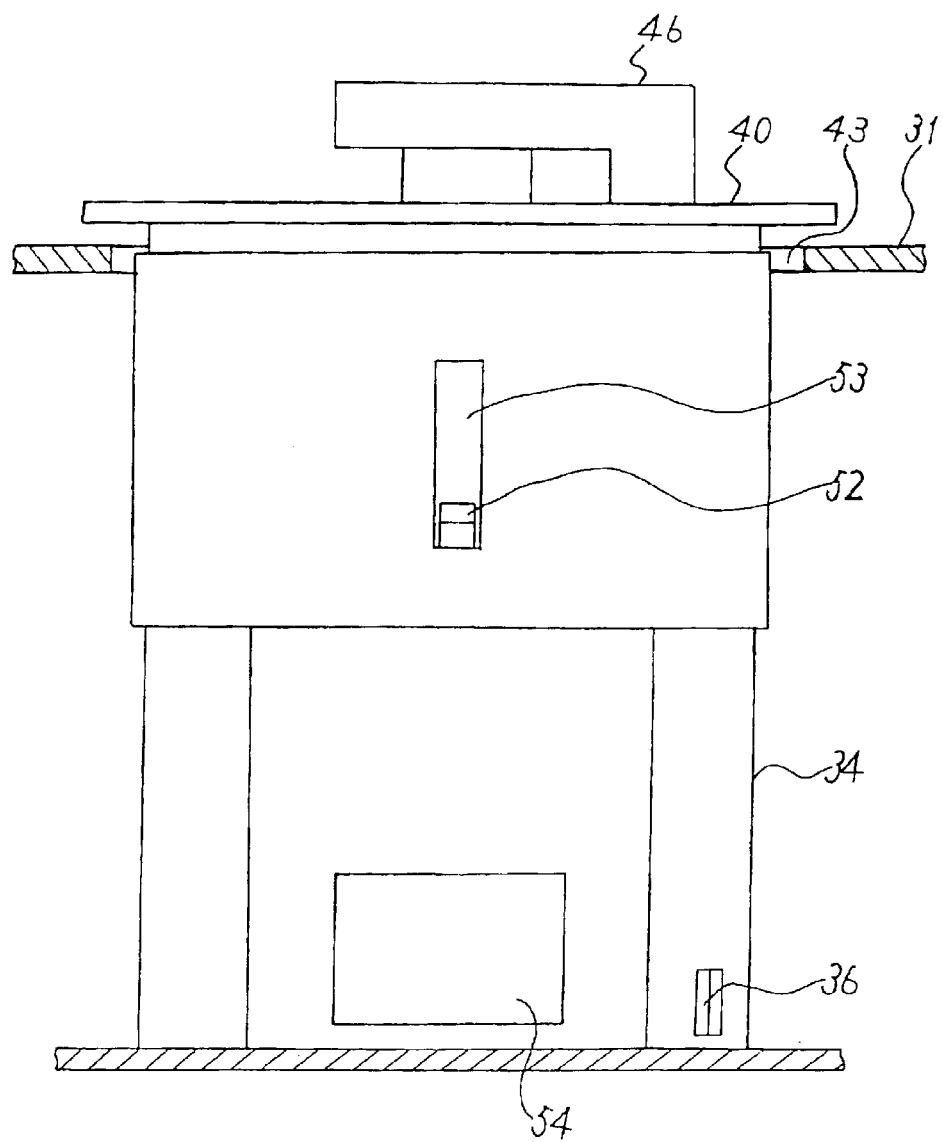
FIG. 2 is a front view of FIG. 1.
Figure 3:
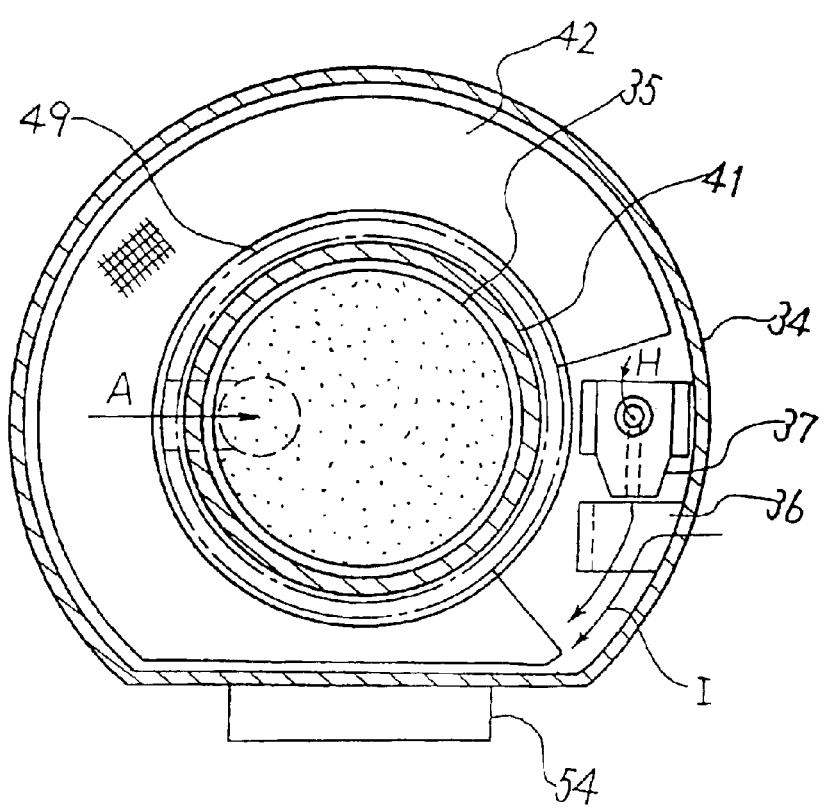
FIG. 3 is a cross sectional view taken along the line III—III of FIG. 1.
Figure 4:
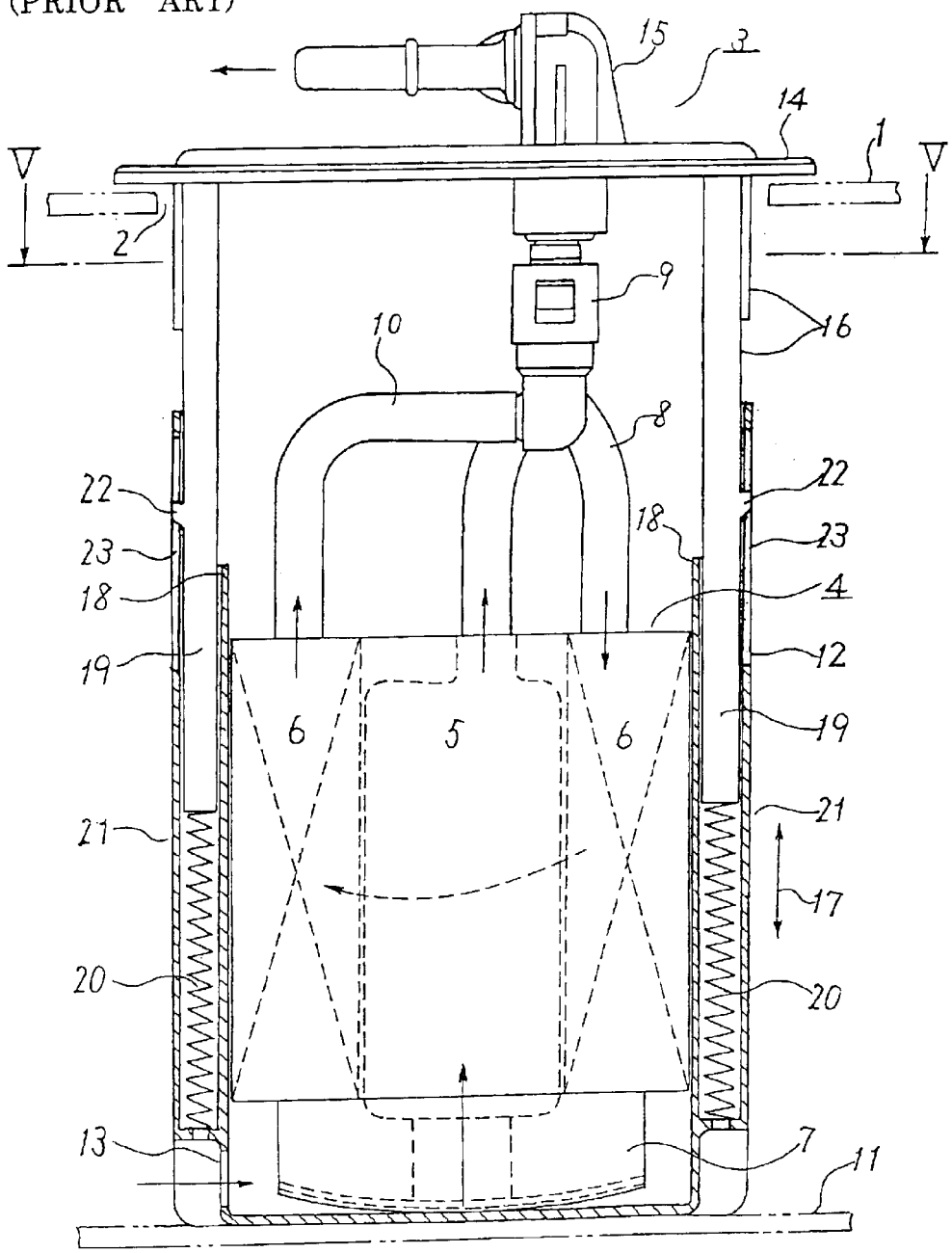
FIG. 4 is a longitudinal cross sectional view showing the conventional fuel supply apparatus.
Figure 5:
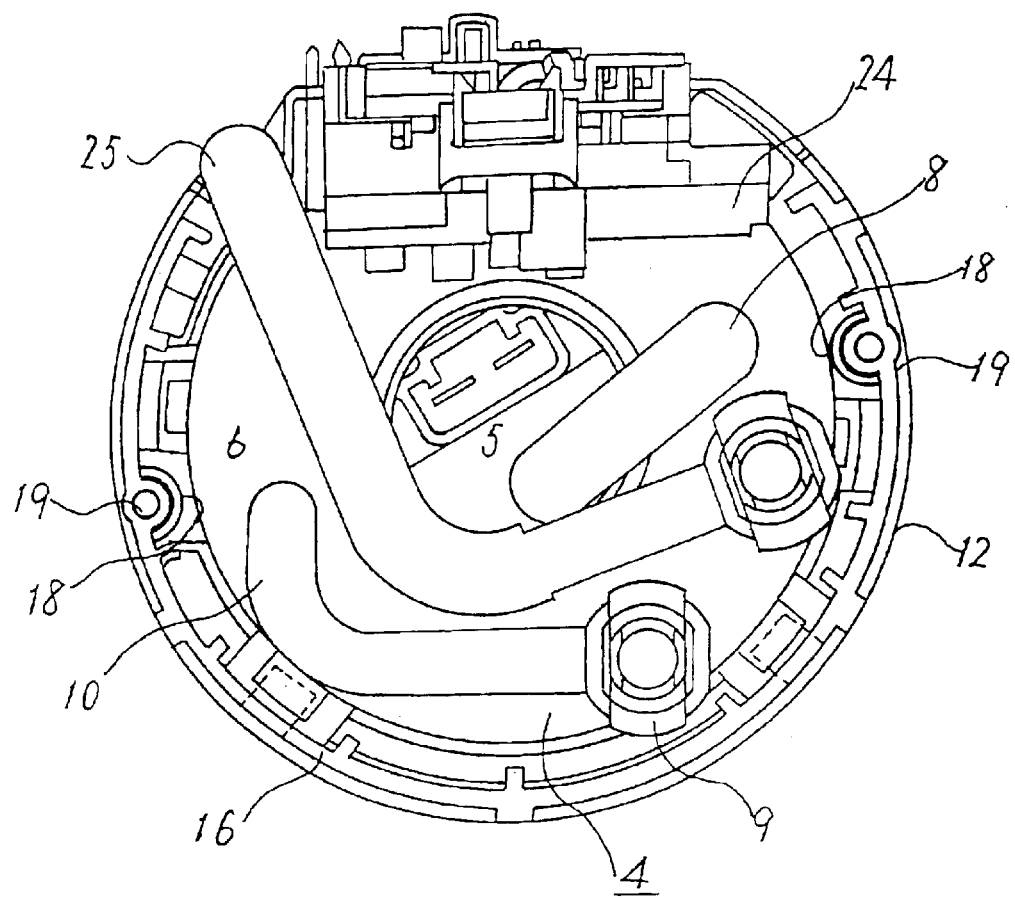
FIG. 5 is a cross sectional view taken along the line V—V of FIG. 4.

FIG. 1 is a longitudinal cross sectional view showing a fuel supply apparatus according to a preferred embodiment of this invention, FIG. 2 is a front view of FIG. 1, and FIG. 3 is a cross sectional view taken along the line III—III of FIG. 1.

A bottom surface 32, which is entirely flat, is formed at a bottom part of a fuel tank 31. A bottomed cylindrical-shaped reservoir 34 of a fuel supply apparatus 33 is disposed in contact with this flat bottom surface 32. This reservoir 34 is arranged so that a required amount of fuel may be retained enabling a fuel pump 35 as described later to exactly pump the fuel even in the case where the fuel tank 31 becomes inclined and the fuel in the fuel tank 31 is retained at one side. A fuel inlet 36 (shown in FIG. 3) that communicates with an internal part of the fuel tank 31 is provided at the bottom of the reservoir 34. A nozzle 37 is located at the fuel inlet 36, and a flexible tube 39, which sends a surplus fuel from a pressure regulator 38, is connected to this nozzle 37.

The reservoir 34 includes a guide tube 41 provided extending toward the side of a lid 40 as described later from a central portion of the bottom surface inside the reservoir 34. A fuel pump 35 is housed and fixed to the inside of the guide tube 41. The fuel pump 35 pumps the fuel stored in the fuel tank 31 and feeds under pressure the fuel to an internal combustion engine such as engine, not shown. An intake filter 42 of substantially C-shape, which is in communication with an intake port of the fuel pump 35, is mounted on the bottom of the fuel pump 35. Further, the reservoir 34 and the guide tube 41 are made of, for example, polyacetal resin.

Meanwhile, a lid 40 closes an opening 43 formed through a top surface of the fuel tank 31. A fuel filter 44, which removes foreign substances mixed into the fuel, is fixed to the side of the lid 40 facing the inside of the fuel tank 31. A discharge port of the fuel pump 35 and an inlet of the fuel filter 44 are connected together by means of a flexible tube 45. Further, an outlet of the fuel filter 44 is connected via the bush 60 to a fuel discharge passage part 46 that is located through the lid 40. The pressure regulator 38, which regulates pressure of the fuel, is connected to the fuel filter 44.

A guide tube 48, which is circumscribed with the guide tube 41 located at the reservoir 34 and can be fitted thereto in a slidable manner, is provided at the fuel filter 44, or the lid 40. An elastic member 49, for example, a coil spring is interposed between the guide tube 48 and the guide tube 41 to constitute a return mechanism 50. The reservoir 34 is fitted telescopically with respect to the lid 40 due to an elastic force provided by the elastic member 49.

In addition, the fuel filter 44 is formed in a hollow, cylindrical shape concentric with the guide tube 48, and an inner diameter of the hollow portion is formed in such a dimension as enabling to house the cylindrical fuel pump 35.

Further, a reservoir-mounting wall 51, which is cylindrical or partially cylindrical-shaped, is formed extending in an axial direction of the reservoir 34 at the back side of the lid 40 or inside the fuel tank 31 so as to surround the fuel discharge passage part 46. The reservoir mounting wall 51 is formed so that inner diameter thereof may be substantially the same as or larger than outer diameter of the fuel filter 44, as well as so that outer diameter thereof maybe substantially the same as or slightly smaller than inner diameter of the reservoir 34. In this manner, the reservoir-mounting wall 51 is made capable of being inserted between the fuel filter 44 and the reservoir 34.

An engaging detent 52 is formed protruding at plural points in a circumferential direction on the outside of the reservoir-mounting wall 51. A plurality of catching slots 53 in which the engaging detent 52 is caught and held in a movable manner over a required length, are formed through the reservoir 34 in an axial (vertical) direction at the places corresponding to the engaging detents 52. Furthermore, an external frame of the guide tube 48, the reservoir-mounting wall 51 and the fuel filter 44 is made of a polyacetal resin, for example.

In addition, although a liquid measure 54 is attached to the outside of the reservoir 34 as may be necessary, in the case of FIG. 3, a part of the cylindrical-shaped reservoir 34 is cut away, and the liquid measure 54 is mounted on this cut-away portion.

Furthermore, a power-feeding connector 55, which supplies an electric power from a battery, not shown, to the fuel supply apparatus 33, is provided on the top surface of the lid 40 of FIG. 1. There is also provided a fuel pump feed connector 56 that supplies an electric power to the fuel pump 35 via the power-feeding connector 55.

In the fuel supply apparatus 33 constructed as described above, an entire length of the fuel supply apparatus 33 is adjusted in the following manner. That is, at the time of inserting the reservoir 34 part into the opening 43 of the fuel tank 31 and mounting the lid 40 at the opening 43, since the reservoir 34 is fitted to the lid 40 so as to be capable of moving telescopically utilizing an impetus provided by the elastic member 49, the whole flat bottom surface of the reservoir 34 comes in contact with the bottom surface 32 of the fuel tank 31, whereby the reservoir 34 is retractable with respect to the lid 40, thus an entire length of the fuel supply apparatus 33 is adjusted so as to match depth of the fuel tank 31.

Before mounting the fuel supply apparatus 33 on the fuel tank 31, due to the fact that the engaging detent 52, which is provided at plural points in a circumferential direction on the outside of the reservoir-mounting wall 51, is caught and held in the catching slot 53 provided in the reservoir 34 at the places corresponding to the engaging detents 52, the impetus provided by the elastic member 49 is received thereby preventing the reservoir 34 from being released from the lid 40.

Further, due to the fact that the fuel filter 44 is formed into a hollow cylindrical shape concentric with the guide tube 48, thereby enabling to house the fuel pump 35 in the hollow portion, it is possible to shorten an entire length of the fuel supply apparatus 33.

Now, flow of the fuel in the fuel supply apparatus 33 constructed as described above is described.

(1) When driving the fuel pump 35, the fuel in the reservoir 34 is pumped through the substantially C-shaped intake filter 42, which is mounted on the intake side of the fuel pump 35(B). At this time, relatively large foreign substances having been mixed into the fuel are removed by means of the intake filter 42.

(2) The fuel having been discharged from the discharge port of the fuel pump 35(C) is sent to the inlet of the fuel filter 44 disposed on the side facing the inside of the fuel tank 31 at the lid 40 via the flexible tube 45. During the time when the fuel is flowing through an internal part of the fuel filter 44 from the foregoing inlet, foreign substances having been contained in the fuel, for example, abrasion powder of any brush of an electric motor forming the fuel pump 35, are filtered and removed.

(3) The fuel having got out of the outlet of the fuel filter 44(D) gets into the fuel discharge passage part 46, which is provided through the lid 40, by way of the bush 60(E). Thereafter, the fuel is fed to an internal combustion engine such as engine via a fuel hose, now shown, from the fuel discharge passage part 46(F).

(4) Meanwhile, a surplus fuel to be discharged for the purpose of regulating a fuel pressure from the pressure regulator 38(G) is sent to the nozzle 37, which is disposed at the fuel inlet 36 on the bottom of the reservoir 34, through the flexible tube 39(H), and sprayed from the nozzle 37 into an internal part of the reservoir 34.

(5) At this time, a negative pressure is generated about the fuel inlet 36 at the bottom of the reservoir 34 due to the fuel having been sprayed from the nozzle 37, and the fuel in the fuel tank 31 is taken into an internal part of the reservoir 34 due to the negative pressure (I).

In addition, a fluid level of the fuel in the fuel tank 31 is measured by means of the liquid measurement device 54 mounted on the outside of the reservoir 34.

As described above, a fuel supply apparatus 33 according to this embodiment includes: a lid 40 which is mounted at an opening 43 of a fuel tank 31, and through which a fuel discharge passage part 46 is provided; a fuel pump 35 that sends under pressure fuel in the fuel tank 31 through the fuel discharge passage part 46; a fuel filter 44 that filters the fuel having been discharged from this fuel pump 35; and a reservoir 34 that is in contact with a bottom surface 32 of the fuel tank 31, and retains the fuel in the fuel tank 31. In this fuel supply apparatus, the lid 40 includes a first guide tube 48 provided extending toward the inside of the fuel tank 31; the reservoir 34 is provided extending from a bottom thereof toward the side of the lid 40 and houses the fuel pump 35 as well as includes a second guide tube 41 that is inscribed with the first guide tube 48 and fitted thereto in a slidable manner. This fuel supply apparatus further includes an elastic member 49 that is inserted and fitted to an outer circumference of the second guide tube 41 as well as interposed between the reservoir 34 and the lid 40 thereby enabling the reservoir 34 to travel telescopically with respect to the lid 40. As a result, an average diameter of the elastic member 49 is made larger, thereby enabling a load change per a deflection length of the elastic member 49 to be smaller. Accordingly it is possible to make a load, which is applied to the tank, smaller while reliably achieving the adaptability for dimension change in the fuel tank 31. Furthermore, since only one coil spring of a large diameter is located at a central portion of the reservoir 34, the reservoir 34 is stably pressed onto the fuel tank without generation of any unbalance in the pressure load provided by a plurality of springs.

Further, the fuel pump 35 is located from the reservoir 34 to the lid 40; and the fuel filter 44 is located on the lid 40 outside an outer circumferential surface of the fuel pump 35, surrounding the fuel pump 35. As a result, since the fuel pump 35 is partially housed in a hollow portion of the fuel filter 44, it is possible to shorten an entire length of the fuel supply apparatus 33. Furthermore, retention volume of the fuel does not come to be smaller by the amount corresponding to the volume of the fuel filter part 44 in the state that a fuel liquid level in internal part of the reservoir 34 is low. Thus, it is unnecessary to make the reservoir 34 larger in size in order to prevent the difficulty in pumping the fuel due to inclination of the fuel tank.

INDUSTRIAL APPLICABILITY

As described above, a fuel supply apparatus according to the present invention is adaptable to be mounted on a fuel tank to supply the fuel to an internal combustion engine.

What is claimed is:

1. A fuel supply apparatus comprising:
   a lid which is mounted at an opening of a fuel tank, and through which a fuel discharge passage part is provided;
   a fuel pump that sends fuel in said fuel tank through said fuel discharge passage part;
   a fuel filter that filters fuel discharged from said fuel pump;
   a reservoir that is in contact with a bottom surface of said fuel tank, and retains the fuel in said fuel tank;
   said lid includes a first guide tube which extends toward an inside of said fuel tank;
   said reservoir extends from the bottom surface of said fuel tank toward a side of said lid and houses said fuel pump, and also includes a second guide tube that is inscribed within said first guide tube and fitted thereto in a slidable manner; and
   said fuel supply apparatus further comprising an elastic member fitted to an outer circumference of said second guide tube and interposed between said reservoir and said lid thereby enabling said reservoir to travel telescopically with respect to said lid, said elastic member being radially surrounded by said reservoir.

2. The fuel supply apparatus according to claim 1, wherein said elastic member is fitted to an outer circumference of said second guide tube and is interposed between said second guide tube and said first guide tube to enable said reservoir to travel telescopically with respect to said lid.

3. The fuel supply apparatus according to claim 2, wherein said elastic member is a coil spring that is inserted in and fitted to the outer circumference of said second guide tube.

4. The fuel supply apparatus according to claim 1, wherein said fuel pump is disposed from said reservoir to said lid; and said fuel filter is disposed on said lid outside an outer circumferential surface of said fuel pump, surrounding said fuel pump.

5. The fuel supply apparatus according to claim 2, wherein fuel pump is disposed from said reservoir to said lid; and said fuel filter is disposed on said lid outside an outer circumferential surface of said fuel pump, surrounding said fuel pump.

6. The fuel supply apparatus according to claim 3, wherein said fuel pump is disposed from said reservoir to said lid; and said fuel filter is disposed on said lid outside an outer circumferential surface of said fuel pump, surrounding said fuel pump.

* * * * *